United States Patent
Kim et al.

(10) Patent No.: US 10,212,065 B2
(45) Date of Patent: Feb. 19, 2019

(54) EXTENDED TIME REFERENCE GENERATION

(71) Applicant: GATESAIR, INC., Mason, OH (US)

(72) Inventors: Junius A. Kim, Cincinnati, OH (US); Keyur R. Parikh, Cincinnati, OH (US)

(73) Assignee: GATESAIR, INC., Mason, OH (US)

(*) Notice: Subject to any disclaimer, the term of this patent is extended or adjusted under 35 U.S.C. 154(b) by 183 days.

(21) Appl. No.: 15/298,954

(22) Filed: Oct. 20, 2016

(65) Prior Publication Data
US 2018/0115478 A1    Apr. 26, 2018

(51) Int. Cl.
| | |
|---|---|
| *H04L 12/26* | (2006.01) |
| *H04W 56/00* | (2009.01) |
| *H04H 20/65* | (2008.01) |
| *H04W 4/06* | (2009.01) |
| *H04L 7/00* | (2006.01) |
| *H04N 21/8547* | (2011.01) |
| *H04N 21/242* | (2011.01) |
| *H04N 21/43* | (2011.01) |
| *H04W 84/02* | (2009.01) |

(52) U.S. Cl.
CPC ......... *H04L 43/106* (2013.01); *H04H 20/65* (2013.01); *H04L 7/0008* (2013.01); *H04N 21/242* (2013.01); *H04N 21/4305* (2013.01); *H04N 21/8547* (2013.01); *H04W 4/06* (2013.01); *H04W 56/001* (2013.01); *H04W 84/022* (2013.01)

(58) Field of Classification Search
None
See application file for complete search history.

(56) References Cited

U.S. PATENT DOCUMENTS

| | | | |
|---|---|---|---|
| 4,696,052 | A | 9/1987 | Breeden |
| 5,280,629 | A | 1/1994 | Lo Galbo et al. |
| 6,011,977 | A | 1/2000 | Brown et al. |
| 6,813,257 | B1 | 11/2004 | Emmons et al. |
| 6,931,023 | B2 | 8/2005 | Lin et al. |
| 7,085,276 | B1 | 8/2006 | Heitmann |
| 7,346,005 | B1 | 3/2008 | Dowdal |

(Continued)

FOREIGN PATENT DOCUMENTS

| | | |
|---|---|---|
| EP | 2086237 A1 | 8/2009 |
| EP | 2262182 A1 | 12/2010 |

(Continued)

*Primary Examiner* — Kodzovi Acolatse
(74) *Attorney, Agent, or Firm* — Tarolli, Sundheim, Covell & Tummino LLP

(57) ABSTRACT

As one example, a system includes a first timestamp generator to provide a first timestamp in response to at least one input clock signal. The first timestamp may be derived based on a global time base and have a resolution that resides within a first range of values corresponding to a first time range. A second timestamp generator provides a second timestamp in response to the at least one input clock signal. The second timestamp may be derived based on a second time base and have a resolution that resides within a second range of values complementary to the first timestamp and corresponding to a second time range that is greater than the first time range. A combiner combines the first and second timestamps to provide a reference timestamp having a value over an extended range of continuous time values.

21 Claims, 6 Drawing Sheets

(56) References Cited

U.S. PATENT DOCUMENTS

| | | |
|---|---|---|
| 7,379,466 B2 | 5/2008 | Kavaler |
| 7,613,212 B1 | 11/2009 | Raz et al. |
| 8,135,852 B2 | 3/2012 | Nilsson et al. |
| 8,300,668 B2 | 10/2012 | Kim et al. |
| 8,306,063 B2 | 11/2012 | Erdal et al. |
| 2004/0190459 A1 | 9/2004 | Ueda |
| 2004/0258047 A1 | 12/2004 | Miao |
| 2006/0088023 A1 | 4/2006 | Muller |
| 2007/0195824 A9 | 8/2007 | Chapman et al. |
| 2008/0151776 A1 | 6/2008 | Kure |
| 2008/0187009 A1 | 8/2008 | Kim |
| 2009/0083766 A1 | 3/2009 | Karne et al. |
| 2009/0219073 A1* | 9/2009 | Sun ................. G04F 10/005 327/285 |
| 2009/0288125 A1 | 11/2009 | Morioka |
| 2009/0304201 A1* | 12/2009 | Bekiares .......... H04N 21/41415 381/77 |
| 2011/0002311 A1 | 1/2011 | Wang |
| 2011/0164178 A1 | 7/2011 | Hardy |
| 2011/0185214 A1* | 7/2011 | Luskind .................. G06F 1/12 713/375 |
| 2011/0228888 A1 | 9/2011 | Gelter |
| 2011/0305170 A1 | 12/2011 | Lai et al. |
| 2012/0275333 A1 | 11/2012 | Cociglio |
| 2015/0215193 A1 | 7/2015 | Kim et al. |
| 2017/0213077 A1* | 7/2017 | Park ........................ G06F 3/017 |

FOREIGN PATENT DOCUMENTS

| | | |
|---|---|---|
| EP | 2363972 A1 | 9/2011 |
| WO | 2011078408 A2 | 10/2001 |
| WO | 2005114948 A1 | 12/2005 |
| WO | 2009109069 A1 | 9/2009 |
| WO | 2009154704 A1 | 12/2009 |

* cited by examiner

EXTENDED TIME REFERENCE GENERATION

TECHNICAL FIELD

This disclosure relates generally to generation of an extended time reference.

BACKGROUND

Single frequency networks or simulcasting using multiple transmitters with overlapping receiver coverage areas can provide broadcasters with significant advantages in increased geographical coverage area and lower operating costs. Simulcasting of media can also be implemented for different versions, such as concurrently broadcasting both analog and digital versions of the same media content. For example, such simulcasting can be transmitted over the same channel or be transmitted over multiple different channels. In some examples, a user device may automatically or manually switch from one version to another version of the simulcast media being or move from one coverage area to another. The effectiveness of such simulcasting depends upon accurate synchronization broadcast signal to provide substantially seamless reception with minimum artifacts. The synchronization of multiple signals can be controlled based on timestamps.

SUMMARY

As one example, system includes a first timestamp generator to provide a first timestamp in response to at least one input clock signal. The first timestamp may be derived based on a global time base and have a resolution that resides within a first range of values corresponding to a first time range. A second timestamp generator provides a second timestamp in response to the at least one input clock signal. The second timestamp may be derived based on a second time base and have a resolution that resides within a second range of values complementary to the first timestamp and corresponding to a second time range that is greater than the first time range. A combiner combines the first and second timestamps to provide a reference timestamp having a value over an extended range of continuous time values.

Another example provides a simulcast transmission system that includes a broadcast controller and a plurality of transmitters. The broadcast controller is configured to generate a data stream of data blocks and to packetize each data block of the data stream for transmission via a network. The broadcast controller includes a timestamp generator to generate an extended timestamp associated with generation of each respective data block of the data stream in a global time base. The extended timestamp may be a combination of first and second timestamps, each of the first and second timestamps being generated with reference to a respective time base and in synchronization with respect to each other over a corresponding range of values in different and complementary time ranges. The broadcast controller further is configured to bind the extended timestamp associated with a given one of the data blocks to a respective one of the data packets of the data stream. The plurality of transmitters each receives a respective data stream of data packets from the network. Each of the plurality of transmitters may be configured to extract the extended timestamp from the header of each of the data packets in the data stream and to process and convert the data stream into an analog output signal for simulcast transmission. Each of the plurality of transmitters may include a simulcast controller configured to measure a delay associated with each of the data blocks based on the respective extended timestamp relative to the global time base and to control at least a portion of the processing and conversion of the data stream into the analog output signal based on the measured delay to synchronize transmission of the analog output signal from each of the plurality of transmitters.

Another example provides a method that includes generating a first timestamp in response to at least one clock signal. The first timestamp may be derived based on a global time base and having a resolution that resides within a first range of time values. The method also includes generating a second timestamp in response to the at least one clock signal. The second timestamp may be derived based on a second time base and having a resolution that resides within a second range of time values that is complementary to and greater than the first range of time values. The method also includes combining the first and second timestamps to provide an extended timestamp representing a time value within a range of continuous time values.

DETAILED DESCRIPTION

Figure 1:
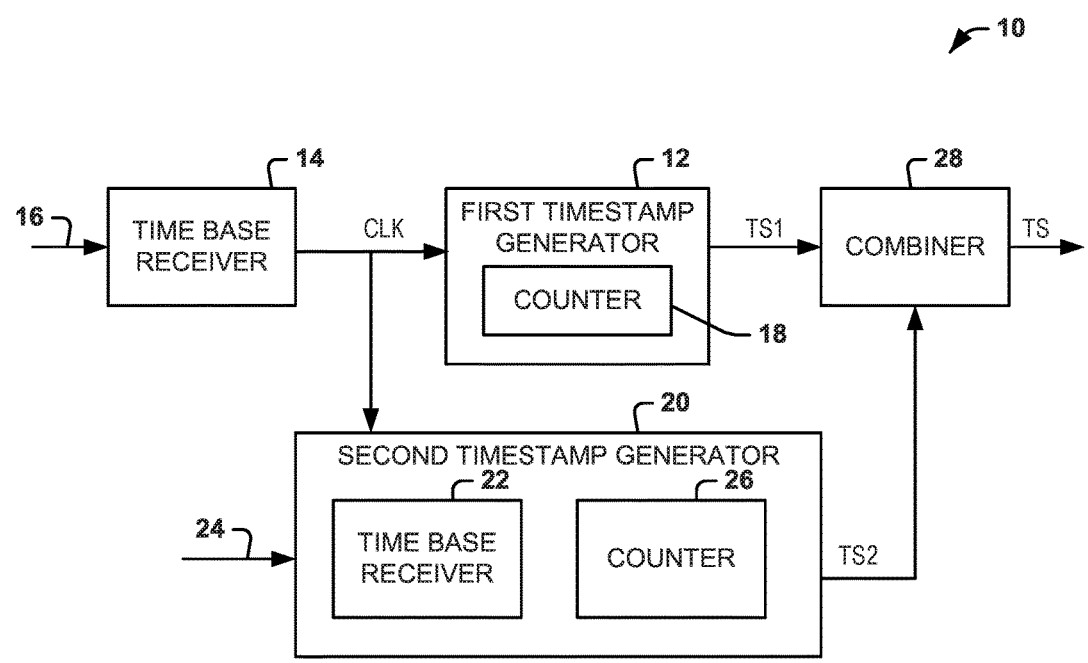
FIG. 1 illustrates an example of a system to generate an extended time reference.

This disclosure relates generally to network and communication systems, and more specifically to generating an extended timestamp. The systems and methods disclosed herein can be configured to generate a timestamp that is associated with each broadcast transmission, such as multiple simulcast transmissions sent by one or more radio frequency (RF) transmitters.

As an example, a transmitter system, which can be implemented as a simulcast transmission system, includes a timestamp system that is configured to generate a timestamp associated with data blocks that are being transmitted. The timestamp system includes a first timestamp generator to provide a first output time reference in response to at least one input clock signal. For example, the first output time reference is derived based on a global time base, such as a global positioning system (GPS) signal. A GPS receiver thus may receive the GPS signal to generate one or more clock signals used by the first timestamp generator. The first timestamp generator outputs the time reference with a resolution that resides within a first range of time values (e.g., a digital value having a predetermined number of bits).

The timestamp system also includes a second timestamp generator to provide a second output time reference in response to the at least one input clock signal that is used by the first timestamp generator. For example, the second timestamp generator employs a second time reference generator that uses a second time base, such as may be different and coarser than the time base used by first timestamp generator. The second output time reference is derived based on the second time base and thus has a resolution that resides within a second range of time values complementary to the first timestamp generator and is greater than the first range of time values. As an example, the first timestamp generator provides a timestamp with high (e.g., nanosecond) resolution over a predetermined time interval and the second timestamp generator provides its timestamp with a lower (e.g., second) resolution. A combiner combines the first and second output timestamps to provide a reference timestamp having a continuous time value over an extended range of time values. The result is an extended timestamp having a resolution that corresponds to the high resolution of the first time base of the first timestamp generator and having a range that corresponds to the range of the second time base of the second timestamp generator.

As a further example, in a simulcast transmission system, the media blocks can be transmitted with the extended timestamps to enable accurate simulcasting of media, even where the delays between the different transmissions and/or versions of the media can be greater than the maximum time range of the first timestamp generator. A delay controller at the simulcast transmitter can compare a delay time of media that is computed based on the extended timestamp with a preprogrammed delay time to control processing (e.g., decoding) of the data stream based on the comparison. For example, the delay controller may control the delay via a jitter buffer to adjust the delay associated with converting the media data to an analog output for transmission. Therefore, the timing of the transmission of the data stream can be controlled, such as to synchronize transmission of data blocks from each of the plurality of transmitters in the simulcast transmission system.

FIG. 1 depicts an example of a timestamp generation system 10. As disclosed herein, the system 10 may be used to generate an extended timestamp TS that is used in synchronizing simulcast streams of media with respect to each other.

As shown in the example of FIG. 1, the system 10 includes a first timestamp generator 12 to provide a first output time reference TS1 in response to at least one input clock signal (CLK). The clock and resulting time reference TS1 may be referenced to a global time base. For example, a time base receiver 14 receives a global time base signal 16, such as global positioning system (GPS) signal from one or more satellites. The receiver 14 thus generates one or more clock signals CLK derived from the received GPS signal 16. For example, the receiver 14 generates one high frequency clock signal (e.g., a 10 MHz clock) and another lower frequency clock (e.g., a 1 Hz clock).

The timestamp generator 12 includes a counter 18 that provides a time value, corresponding to the timestamp TS1, in response to the clock signal (or clock signals) CLK. Thus, the timestamp generator 12 thus provides the timestamp TS1 with a value that resides within a first range of time values. The counter 18 increments the timestamp value TS1 in response to input CLK to provide a resolution of the timestamp TS1 according to its time base. For example, the counter includes a number of bits that increment in response to the input CLK over its time range and is then reset.

In some circumstances, the time range of the first timestamp generator 12 may be insufficient to synchronize simulcast media streams. For example, if the delay between simulcast media streams exceeds the time range of the first timestamp generator 12 (e.g., the maximum time value of TS1), the simulcast system is incapable of measuring delay and thus adequately time synchronizing the simulcast media streams. Accordingly, the system 10 includes a second timestamp generator 20 that cooperates with the first timestamp generator 12 to provide an extended timestamp having a continuous time interval over an extended range of values. For example, the system 10 can provide the extended timestamp TS to vary with the same level of accuracy as the first timestamp generator 12, but over a time range that is many times greater than the time range of the first timestamp generator.

The second timestamp generator 20 provides a second output time reference, a timestamp TS2, in response to the clock signal. The second timestamp generator 20 provides timestamp TS2 with a second time range that is greater than the first time range and is complementary to the timestamp TS1 produced by the first timestamp generator. The resolution of the second timestamp also is coarser than the timestamp TS1, and is sometimes referred to herein as a coarse timestamp. Additionally, the second timestamp generator 20 derives the second timestamp TS2 from a second time base, which can be produced by another time base receiver 22.

In the example of FIG. 1, the time base receiver 22 for the second timestamp generator 20 is separate from the time base receiver 14 to which the first timestamp generator references its timestamp TS1. As an example, the time base receiver 22 is implemented as a timing interface to derive a corresponding time base. In some examples, the time base receiver 22 derives its time base from a time base signal received via a connection 24, such as an absolute time reference. However, since the resolution of TS2 is less than TS1 (e.g., by several orders of magnitude), the time base receiver 22 likewise does not require the accuracy of the first time base receiver 14. This permits a different and less expensive implementation for the time base receiver 22 than time base receiver 14. Regardless of its implementation, each time base receiver 14 and 22 may derive its time base to be referenced to a common time standard, such as disclosed herein.

By way of example, the time base receiver 22 can derive its time base from an absolute time standard that is accurate to about ½ of the time range of the first timestamp generator 12. For instance, if timestamp generator 12 has a time range of one second, the time base receiver 22 should be accurate to about 0.5 seconds. Examples of clock synchronization protocols that can be utilized by the time base receiver 22 include networking protocols, such as the Network Time Protocol (NTP), Precision Time Protocol (PTP), National Marine Electronics Association (NMEA) or the like that provide absolute time references to a time standard (e.g., UTC or TAI) that can be synchronized over a computer network or other communication link (e.g., connection 24).

As a further example, the time bases used by each of the second time base receiver 22 and the first time base receiver 14 are referenced to the same time standard. For example, NTP and GPS can both provide respective time bases that are ultimately referenced to a predetermined time standard, such as Coordinated Universal Time (French: Temps Universel Coordonné) or UTC. For example, the GPS system uses TAI (International Atomic Time) as its time standard, which has its epoch origin at 01.01.1970 00:00:00 UTC. Unlike UTC, TAI does not feature leap seconds, thus providing unambiguous monotonic time information. However, actual UTC time may be calculated from GPS by taking all leap second occurrences since 01.01.1970 into account.

The second timestamp generator 20 employs the absolute time reference (e.g., a coarse time reference) derived by time base receiver 22 to set a corresponding time value for timestamp TS2. For example, the second timestamp generator 20 is can load a corresponding time value (e.g., a number of bits) into an associated counter 26. The second timestamp generator 20 may trigger loading the counter in response to entering a calibration mode, such as at start up (e.g., power up) or in response to detecting another event (e.g., detecting a difference between the timestamp TS2 and the coarse time reference from receiver 22). Once the counter 26 is set, the timestamp generator 20 may employ the clock signal CLK to increment the counter timestamp TS2 going forward. In this way, both the first and second timestamp generators 12 and 20 may operate in synchronization even though they timestamps over different time ranges.

The system 10 also includes a combiner 28 to combine the first and second output timestamp references TS1 and TS2 to provide the extended reference timestamp TS, which provides a repeating continuous time value that counts over an extended time range. While both timestamps TS1 and TS2 are synchronized via common clock source(s) CLK, they are derived, at least initially, independently from different time bases that are each referenced to a common time standard (e.g., UTC), such as disclosed herein. For example, the first timestamp TS1 provides a high resolution timestamp over a continuous time range (e.g., 1 second) and the second timestamp TS2 provides a coarser resolution timestamp over a time range that is an integer multiple of the TS1's time range (e.g., plurality of seconds or minutes). As a result, the extended timestamp TS can be used to detect and correct for delays between simulcast transmissions of data blocks up to the aggregate extended time range, with the accuracy of the first timestamp TS1 and the range of the second timestamp TS2.

Figure 2:
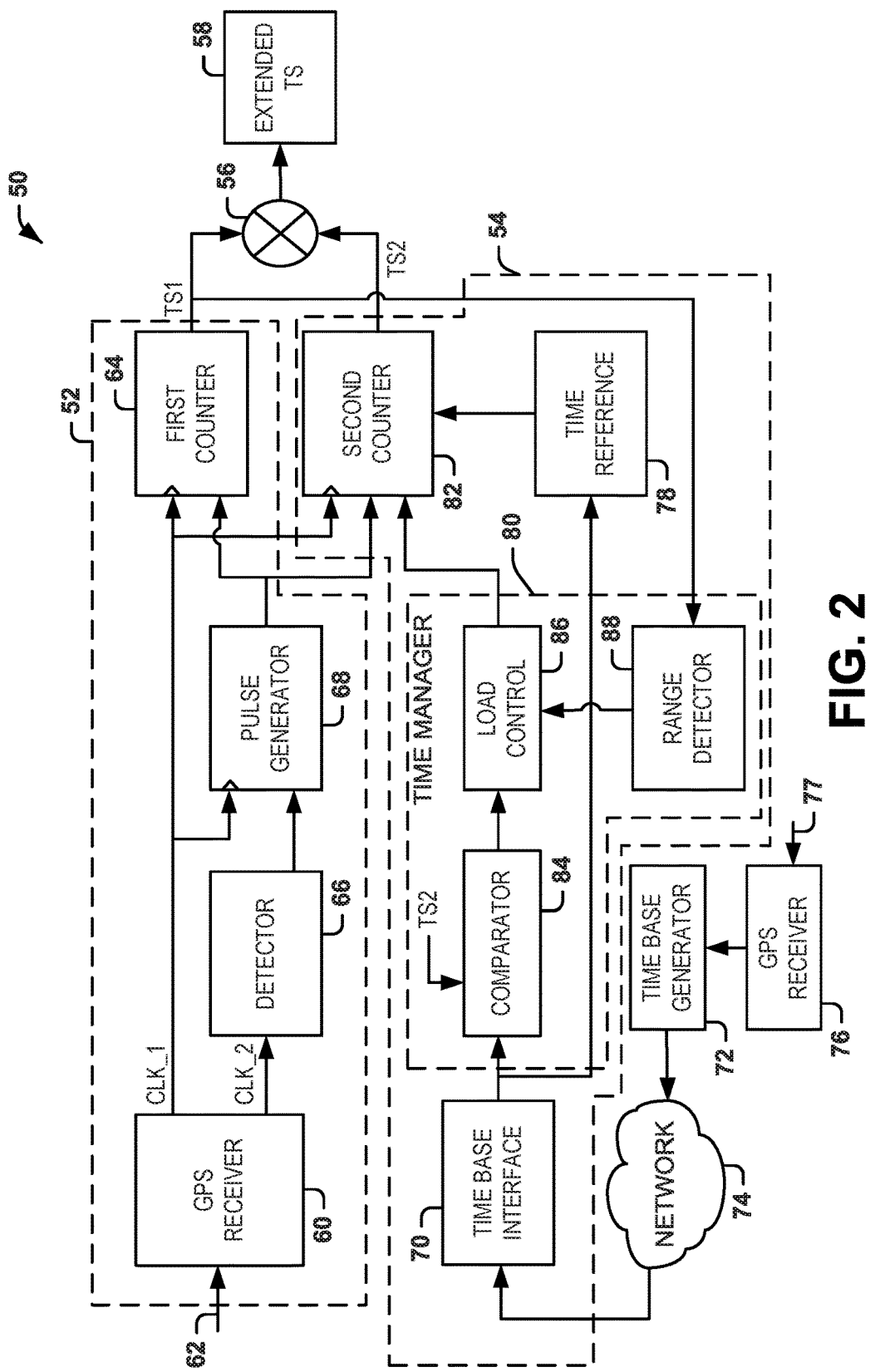
FIG. 2 illustrates an example of another system to generate an extended time reference.

FIG. 2 depicts an example of a system 50 to generate an extended timestamp (TS) 58, such as stored in a register. The system 50 includes multiple timestamp generators 52 and 54. Each of the timestamp generators 52, 54 provides a respective timestamp TS1 and TS2 according to a different range of time values. A combiner 56 combines TS1 and TS2 to provide the extended timestamp TS that provides a continuous range of values over an extended time range determined by time range of TS2 and with an accuracy (e.g., resolution) defined by the resolution of TS1.

In the example of FIG. 2, timestamp generator 52 includes a GPS receiver 60 that receives a time base signal, such as a GPS signal 62 that is referenced to known time standard. For instance, the GPS receiver 60 can include an antenna to receive the GPS signal 62 from one or more satellites. The GPS receiver 60 may generate multiple clocks, demonstrated at CLK_1 and CLK_2. The GPS receiver 60 can employ internal clock generators that are synchronized (e.g., via phase locked loop or other mechanism) with respect to the input GPS signal 62. The GPS receiver 60 may employ a stable internal local oscillator, such as an oven controlled oscillator that is disciplined to CLK_2 to provide CLK_1. Each of the clocks CLK_1 and CLK_2 has a different clock frequency. For example, for every 1 Hz time period of CLK_2, 10,000,000 pulses are generated on the CLK_1 signal. The internal oscillator of the GPS receiver 60 may be configured to maintain sufficient accuracy if the GPS signal is lost. If the system "free runs" and the CLK_1 and CLK_2 signals continue to be provided without a GPS reference, for example, internal clocks within the receiver 60 may continue to provide accurate clocks CLK_1 and CLK_2 to enable similar accuracy for the timestamp signal TS1 until the GPS signal is reestablished.

The GPS receiver 60 can be implemented as a proprietary device or as a commercially available unit that resides within or external to the timestamp generator 52. For example, commercially available GPS receivers to generate multiple clock signals CLK_1 and CLK_2 are available from Trak Microwave Corporation of Tampa, Fla. as well as from Spectracom USA of Rochester, N.Y. In these and many other existing commercially available GPS time base receivers, only 1 Hz and 10 MHz signals are provided. This limits the time range of measurement, hence the approach disclosed herein provides another time base receiver and associated components (e.g., in the second time stamp generator 54) to extend the time range of measurement beyond that of the first time stamp generator 52.

In the example of FIG. 2, CLK_1 is provided to a clock input of a first counter 64 to increment a first timestamp TS1 in response to CLK_1. As an example, CLK_1 is a high frequency clock (e.g., 10 MHz or higher), and its frequency defines the resolution of the first timestamp TS1. The GPS receiver 60 provides the other clock signal CLK_2 at a lower frequency than CLK_1. For example, CLK_2 is provided at 1 Hz, such as corresponding to the Coordinated Universal Time (UTC) second. The time range of TS1 thus may correspond to the period of the second clock signal CLK_2, while incrementing at the frequency of CLK_1 to establish the resolution for its time base.

As an example, the second clock signal CLK_2 can be utilized to reset the first counter 64 commensurate with the period of each clock signal CLK_2. To control resetting the first counter 64, the timestamp generator 52 can employ a reset control that includes a detector 66 and a pulse generator 68. For instance, the detector 66 can implement edge detection with respect to CLK_2, such as to detect a rising edge of each pulse of the clock signal CLK_2. The detector 66 can provide an output to an input of the pulse generator in response to detecting a positive edge on CLK_2. The pulse generator 68 also receives CLK_1 at its clock input. The pulse generator 68 generates a periodic output pulse responsive to the detector at each period of CLK_2 and that is synchronized to CLK_1. The output pulse has a pulse width that is less than or equal to the period of CLK_1 and at an interval according to the detected edge of CLK_2. The pulse generator 68 provides the pulse, for example, at the rising edge of each clock signal CLK_2 with a pulse width corresponding to the period of CLK_1.

In the example of FIG. 2, the pulse generator 68 provides the pulse to a reset input of first counter 64 and to an input of the other clock generator 54, as disclosed below. For example, the counter 64 can increment TS1 in response to CLK_1 (e.g., every 100 nS) to count from a start value to a maximum value (e.g., counting from 0 to 9,999,999) and to reset the counter each period (e.g., each second) in response to the reset signal from the pulse generator 68 based on CLK_2. As one example, the first counter 64 provides TS1 as a repeating binary value of 24 bits in response to a 10 megahertz input clock CLK_1. In such example, the resulting resolution of TS1 can be 100 nanoseconds. Other resolutions can also be provided in other examples depending on application requirements.

The second timestamp generator 54 provides a second timestamp TS2 having a time range that is much greater than the time range of TS1 and based on another time base. In the example of FIG. 2, a time base interface 70 provides a time reference 78 based on a time base signal, such as received via from a network 74. For example, the time reference 78 may be an absolute time that is derived from the time base signal and stored in a register. As disclosed herein, the time base of the second timestamp generator 54 is referenced to a common time standard, which is also utilized by the GPS receiver 60 of the first timestamp generator 52.

In some examples herein, the time reference 78 from the time base interface 70 is described to as being a coarse time reference. This nomenclature is by way of comparison with respect to the timing reference of the GPS receiver 60, which may be referred to as a fine (e.g., higher resolution) timing reference. This does not require that the actual timing reference provided by the time base interface 70 be less accurate than that of the GPS receiver 60, but instead is to indicate that the timing constraints of the second timestamp generator 54 are less stringent than the first timestamp generator 52.

As one example, the time base interface 70 is implemented as NTP client software corresponding machine readable instructions executable by a processor, which may be implemented by the timing system 50. The NTP client (interface 70) is programmed to provide the time reference (e.g., an absolute clock) 78 that is synchronized to a network time server, demonstrated as a time base generator 72. In the example of FIG. 2, the interface 70 is connected to the remote time base generator 72, corresponding to the network time server, via the network 74. For example, the network 74 can include one or more wide area network (e.g., the public internet) and/or local area networks implementing a packet switched communications protocol, such as according to the internet protocol (IP) suite.

NTP is an application layer networking protocol in the IP suite for clock synchronization between computer systems over packet-switched, variable-latency data networks (e.g., like network 74). NTP can provide the time base, which is used by the interface 70 to generate the time reference, to within a multiple milliseconds of Coordinated Universal Time (UTC), including within tens of milliseconds where the network 74 includes the public Internet. Using NTP, the time base interface 70 thus may receive timestamps in data packets from the time base generator 72 according to the User Datagram Protocol (UDP). The time base generator 72 is connected to a GPS receiver, and thus can derive the time reference 78 with respect to a global time base signal, such as a GPS signal 77 from a satellite. GPS receiver 76 may be the same or a different implementation of GPS receiver from receiver 60, and thus signals 62 and 77, for example, may be the same or different signals.

In other examples, the time base interface 70 may implement the Simple Network Time Protocol (SNTP), the Precision Time Protocol (PTP, such as defined by one of the IEEE 1588 standards) or operate according to a National Marine Electronics Association (NMEA) standard (e.g., based on EIA-422). For example, SNTP is a simplified version of NTP that may implemented by the interface 70 to synchronize its references clock via the network connection 74. The Precision Time Protocol (PTP) can achieve clock accuracy between accuracies of GPS and NTP (e.g., in the sub-microsecond range). The interface 70 alternatively may access a time base using NMEA protocol over a serial interface. A NMEA sentence is received from a transmitter corresponding to time base generator 72, such as to provide millisecond precision. Other timing protocols and clock references could be used by the second timestamp generator in yet other examples, which may be received via the network 74 or otherwise derived.

In the example of FIG. 2, the second timestamp generator 54 also includes a time manager 80 and a second counter 82. The time manager 80 is configured to control loading a time value from a register, corresponding to the time reference 78, into the second counter 82 to set the second timestamp TS2. The time manager 80 may set the second counter 82 to a starting time value at start up, for example, which is referenced to a predetermined epoch. In some examples, the time base interface 70 employs a converter to convert the absolute time (derived from its time base) to a corresponding absolute time value in the same range (e.g., a predetermined number of bits) as the second counter 82 and that is referenced to a predetermined time standard, such as a corresponding to a number of seconds referenced with respect to a prescribed epoch for the system. The second counter 82 can use almost any size, such that its output timestamp TS2 defines a desired time range of extended time timestamp TS. In some examples, portions of the absolute time reference 78 outside the range of the second counter 82 can be ignored (e.g., the portion of the second time reference 78 that is less than 1 second is ignored).

Assuming, for example, that the counter 82 is a four minute counter having a one second count frequency (e.g., an 8 bit counter counting from 0 to 239), the time base interface 70 provides the time reference 78 as a repeating four minute counter, which is synchronized to the absolute time reference from the time base generator 72 and repeats every four minutes. In this example, the epoch for the second counter 82 may provide that a second count of 0 corresponds to the time of day of the minute count with a common factor of 4 and second count of 0. For instance, a second count of 0 is 00:00 (minute:second) or 04:00, 08:00, 12:00 or the like that is referenced to the time standard epoch (e.g., referenced to 00:00:00 UTC on 1 Jan. 1970). Other time ranges and epoch times could be used depending on the time range desired for the second counter 82 so long as uniformly implemented for all systems.

As a further example, the time manger 80 controls loading a time value to set the second counter 82 with respect to the time reference 78. The time manager 80 can trigger the loading in response to detecting an event, such as based on the first timestamp TS1 and the second timestamp TS2. For instance, the time manager 80 includes a comparator 84 to compare the second timestamp TS2 provided by second counter 82 and the time reference 78 provided by the time base interface 70. If the comparator 84 detects a difference between the reference and timestamp TS2, the comparator can provide a trigger signal to enable a load control 86. If the comparison indicates that the second timestamp TS2 is the same as the time reference 78, the comparator can disable or otherwise not activate the load control 86.

In a typical example, the time manager loads the time reference 78 into the second counter 82 only at system start-up. After start-up, the second counter 82 is incremented by the pulse generator 82 which is timed by the GPS receiver 60. By incrementing the second counter 82 based on timing signals generated by the GPS receiver 60, rather than the time base reference 70, both TS1 and TS2 are synchronized to GPS.

The load control 86 also receives an input from a range detector 88 based on the first timestamp TS1. The range detector 88 is configured to monitor TS1 and detect when TS1 has a predetermined value. For example, the range detector 88 can detect when TS1 has a count value that resides in the middle of its 1 second time range. This is done to account for the poor accuracy of the second time reference 78. For example, its accuracy could be as poor as +/−500 mS with the comparison still being valid.

By way of further example, if TS1 is implemented as a one-second counter, range detector 88 can detect when TS1 has a value that represents 0.5 seconds. In response to detecting that TS1 has the predetermined value, range detector 88 enables the load control 86 for synchronizing the second counter 82 based on the time reference 78. In some examples, the process of synchronization of the second counter 82 can be performed at system start-up (e.g., at power up), after which the time manager 80 thus only serves to monitor the second counter 82 and verify its count is correct. In other examples, the synchronization process of the second counter 82 can be performed in response to detecting other events, such as a malfunction or triggering calibration of the system 50.

The load control 86 supplies a load signal to load the time reference 78 into the second counter 82 in response to comparator 84 and range detector 88. For example, in response to TS1 being at its defined midpoint (e.g., 0.5 seconds for a 1 second first counter) and TS2 being different from the time reference 78, the load control 86 provides the load signal to the counter 82 to load the current value of the time reference 78 into the counter. Then, as mentioned, the pulse generator 68 of the first timestamp generator 52 provides the periodic pulse signal to enable the second counter 82 during normal operation when the first counter is reset. Additionally, the high frequency clock signal CLK_1 is provided to a clock input of the second counter 82 so that the first and second counters 64 and 82 increment and remain in synchronization.

As mentioned, the combiner 56 combines the timestamps TS1 and TS2 to provide the extended timestamp TS with a continuous range of values across an aggregate time range. The combiner 56 can provide TS to have an accuracy that corresponds to the first timestamp TS1 and a maximum time range that corresponds to the time range of the second timestamp TS2. For example, the combiner 56 multiplexes timestamps TS1 and TS2 together (e.g., by concatenating TS1 and TS2), such that the TS1 forms the least significant bits (e.g., 24 bits) and TS2 forms the most significant bits (e.g., 8 bits) of the resulting multi-bit timestamp (e.g., 32 bits). This extended timestamp TS thus provides a reference that can be utilized for evaluating the delay among data packets that are transmitted, such as to facilitate synchronizing simulcast media streams as disclosed herein.

Figure 3:
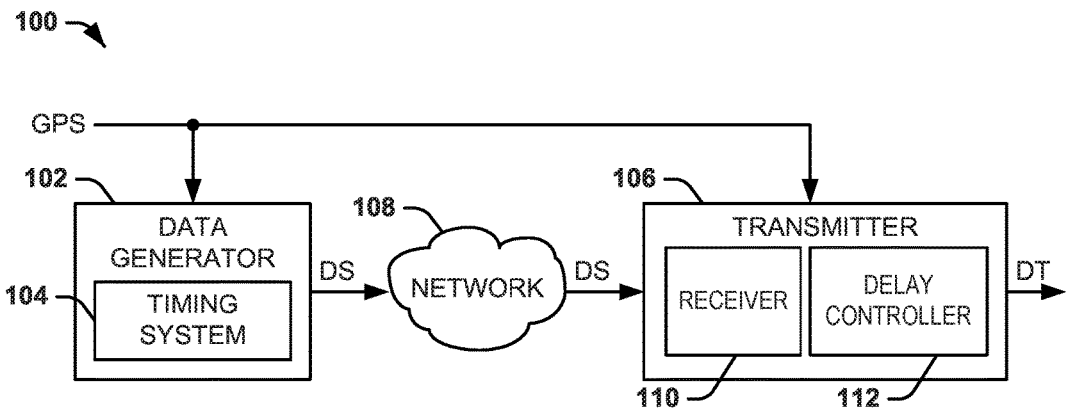
FIG. 3 illustrates an example of a transmitter system.

By way of example, FIG. 3 illustrates an example of a transmission system 100. The transmission system 100 can be implemented in a variety of communications applications, such as broadcast audio and/or video. As an example, the transmitter system 100 can be implemented as part of a simulcast transmission system. The transmitter system 100 includes a data generator 102 that is configured to generate a data stream that includes data blocks (e.g., packets). As an example, the data blocks can be blocks of encoded data, such as can include a compressed or uncompressed media stream (e.g., pulse code modulated (PCM) media).

In the example of FIG. 3, the data generator 102 includes a timing system 104 that is configured to generate an extended timestamp that is associated with each of the data blocks. The timing system 104 can be configured to generate the extended timestamp according to the examples disclosed herein (e.g., system 10, 50 of FIG. 1 or 2, the method of FIG. 7). For example, the timing system 104 can employ multiple time references to generate synchronized fine and coarse timestamps that are combined to provide the extended timestamp. As an example, the timestamp for each data block represents the time that the first bit of the first sample of the data block was generated, and the data generator can insert a timestamp into a packet header associated with each respective data block.

In the example of FIG. 3, the data stream DS is sent to a transmitter 106 via a network link (e.g., a studio-to-transmitter link (STL)) 108. As an example, the network STL 108 can be via an Internet Protocol (IP) network. As a result, the network STL 108 can introduce a delay that is dynamic and which can change over time due to route changes, changes in router characteristics, and/or changes in link characteristics. The transmitter 106 is configured to receive the data stream DS and to then modulate the data stream onto an RF carrier signal. The resultant modulated signal, demonstrated as a signal DT, can be modulated, amplified and transmitted wirelessly via one or more antennas. An example of the transmitter 106 is disclosed herein with respect to FIG. 5.

In the example of FIG. 3, the transmitter 106 includes a receiver 110 and a delay controller 112. The receiver 110 receives the data packets in the data stream DS and buffers the data blocks, such as in a jitter buffer. The receiver 110 is also configured to extract the timestamp from each of the data blocks in the data stream DS, such as from a header of the associated data packet (e.g., at a time that the data packet is released from the jitter buffer). The delay controller 112 can receive the timestamp associated with each of the data blocks in the data stream DS to measure a delay associated with the respective data blocks. As described herein, the term "delay" with respect to the data blocks of the data stream DS refers to an time difference from creation of the respective data block (e.g., at ingest or sampling at the data generator 102) to a time just prior to the data block being transmitted from each transmitter 106 (e.g., a time at which the data is provided to a digital-to-analog converter (DAC)). For example, the delay may correspond to the elapsed time between the broadcast controller or encoder encoding media content and the decoder (located at the RF transmitter) decoding the media material.

As an example, "delay" with respect to the data blocks of the data stream DS may include an aggregate delay associated with sampling and encoding of the data at the data generator 102, communication of the respective data block through the network STL 108, and buffering of the data block (as a data packet) at the transmitter 106, such as in the associated jitter buffer, and processing of the data block (e.g., including encoding and decoding for data compression during transmission through the network STL 18). In the example of FIG. 3, the delay controller 112 also receives the signal GPS, such that the delay controller 112 can subtract a time associated with the timestamp associated with the data block from a real-time reference (e.g., via a real-time clock) that is based on the signal GPS. Thus, the delay of each of the data blocks can be measured individually based on the extracted timestamp of each of the data blocks of the data stream DS.

In addition, the delay controller 112 can be further configured to control a transmission time associated with the transmitted wireless signal DT based on the measured delay of the data blocks. As an example, the delay controller 112 can be configured to compare the measured delay time with a preprogrammed delay time, and can be configured to control the conversion of the data blocks to an analog output signal, such as by controlling the queuing of the data blocks in the jitter buffer of delay controller 112, based on the comparison of the measured delay time with the preprogrammed delay time. The delay controller 112 may control the time of the transmission of the transmitted wireless signal DT to substantially synchronize the transmission of the transmitted wireless signal DT with one or more transmitted signals from other transmitters (e.g., for simulcast transmission), such that the data stream is substantially concurrently transmitted from each of the transmitters, including the transmitter 106, in a time-aligned manner.

For example, the transmitter 106 can be one of a plurality of separate transmitters that are each configured to broadcast a respective data stream. In some examples, the transmitters are geographically separate from each other and broadcast over separate coverage areas that may include overlapping regions with respect to each other. In other examples, the transmitters are configured to transmit different versions of common media content (e.g., a standard definition version and a high definition version), which may be broadcast over the same and/or different geographic regions. In a simulcast system (see, e.g., FIG. 6), each transmitter employs the extended timestamps to synchronize the transmission of the transmitted wireless signals DT.

Figure 4:
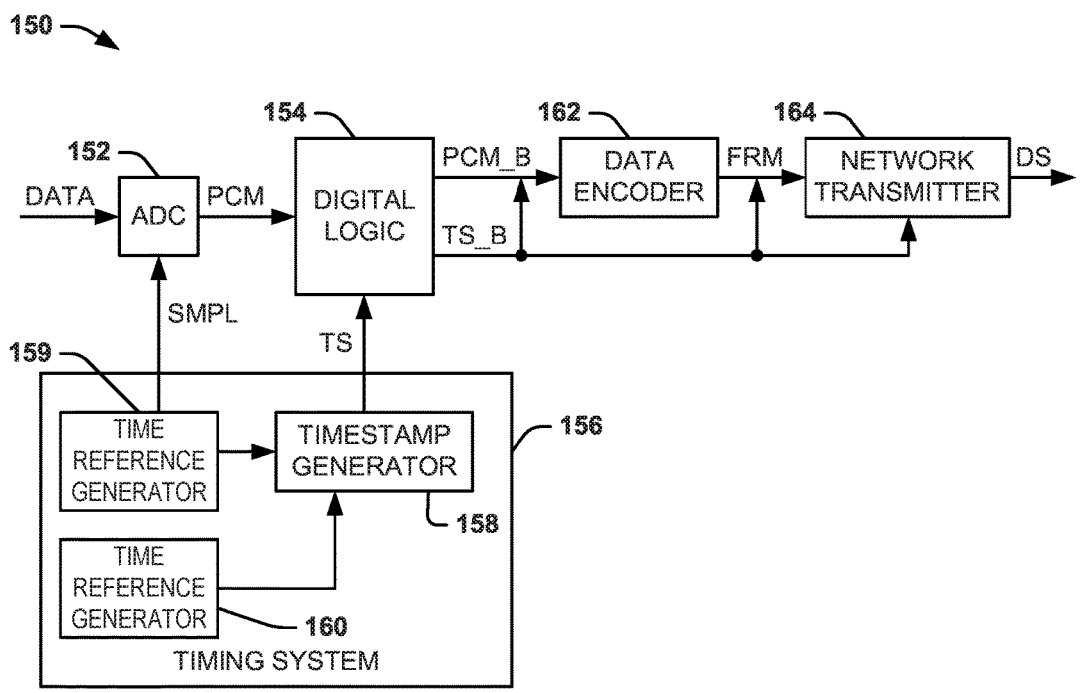
FIG. 4 illustrates an example of a data generator that can be implemented in the transmitter system of FIG. 3.

FIG. 4 illustrates an example of a data generator 150. As an example, the data generator 150 can correspond to the data generator 102 in the example of FIG. 3. Thus, the data generator 150 can be configured to generate and transmit time-stamped data blocks to an associated transmitter (e.g., the transmitter 106) via a network STL (e.g., the network STL 108). Thus, reference may be made to the example of FIG. 3 in the following description of the example of FIG. 4.

The data generator 150 includes an analog-to-digital converter (ADC) 152 that is configured to convert an analog signal DATA to a serial data stream, demonstrated in the example of FIG. 4 as a pulse-code modulated (PCM) signal. Other forms of modulation may be used in other examples. The ADC 152 converts the analog signal DATA into the serial data stream PCM by sampling the analog signal DATA based on a sampling rate clock 153 (e.g., provided by a phase-locked loop (PLL)), which can be referenced to the GPS clock CLK. The PCM signal is provided to a digital logic 154 that is configured to convert the serial data stream into data blocks, demonstrated as a signal PCM_B.

As an example, the data blocks can be (PCM) data buffers (e.g., PCM media, such as audio and/or video samples). While the example of FIG. 4 demonstrates the use of the ADC 152 to provide the digital signal PCM, it is to be understood that the data stream PCM may be generated from a digital signal, such that the ADC 152 is omitted from the data generator 150 in such example. As an example, AES3 is an industry standard protocol for local (e.g., studio environment) serial digital audio transport, and thus would not need the ADC 152. Instead, the conversion process from DATA to PCM could be performed by an AES3 receiver and sample rate converter (not shown). It is to be understood that the approach disclosed herein is applicable to various industry standards, including but not limited to AES3, for exchanging digital information. For instance, various standards exist for providing digital and analog means for communicating such information.

The data generator 150 includes a timing system 156, which can be implemented according to the examples disclosed herein (e.g., FIGS. 1, 2 and/or 7). In this example, the timing system 156 is demonstrated to include a timestamp generator 158 that employs multiple time reference generators 159 and 160, such as may be of the type disclosed herein (e.g., a GPS receiver and an NTP client) to provide respective time references. One time reference generator 159 may include a GPS receiver to generate one or more real-time clock signals CLK based on the GPS signal. As an example, the time reference generator can provide a plurality of clock signals having separate frequencies, such as a first clock signal having a frequency of 1 Hz, such as corresponding to the UTC second, and a second clock signal having a frequency of 10 MHz. The other time reference generator 160 provides a coarse time reference that is derived based on another timing signal (e.g., NTP, PTP, NMEA timing signal etc.) and is synchronized with respect to time reference 159.

The timestamp generator 158 is configured to generate an extended timestamp TS based on a combination of the time references produced by reference generators 159 and 160. The timestamp TS thus can correspond to a time of the first sample of the first bit of the analog signal DATA. As an example, the extended timestamp TS can have a range of values covering a plurality of seconds defined by the range of timestamp values of the time reference generator 160 and have an accuracy defined by the range of the fine time reference 159, such as disclosed herein. For example, the extended timestamp TS can have a 32-bit value that covers a time range of several minutes.

As a further example, the digital logic 154 can include a plurality of sample buffers configured to bind (i.e., associate) respective timestamps TS to respective data blocks (e.g., high and low addresses). As described herein, for example, the timestamp TS associated with a data block PCM_B represents the time that the first bit of the first sample of the block was generated, and can thus correspond to a time of creation of the respective data block PCM_B. Thus, the timestamps TS can be stored or buffered with the binding to the respective data block PCM_B.

The data blocks PCM_B are provided to a data encoder 162 that is configured to encode the time-stamped data blocks by converting the data blocks PCM_B into compressed data frames FRM. For example, the data encoder 162 can implement an audio encoder algorithm function to convert the data blocks PCM_B to the compressed data frames FRM as compressed media packets (e.g., audio such as MPEG, AAC, aptX, etc., video or audio and video). Thus, the compressed data frames FRM can be provided as encoded (compressed) audio frames. In other examples, the data may be uncompressed. Based on the binding of the timestamps TS to the respective data blocks PCM_B, the binding of the timestamps TS can be preserved through the encoding process performed by the data encoder 162. Thus, the timestamps TS can remain bound to respective corresponding compressed data frames FRM through the encoding process. The data encoder 162 function can also be bypassed, for uncompressed data transmission, in which case PCM_B data blocks are sent directly to a network transmitter 164.

In the example of FIG. 4, the data frames FRM are provided to a network transmitter 164. As an example, the network transmitter can be a Real-Time Transport Protocol (RTP) transmitter, such as can employ IP over UDP, such that the compressed data frames FRM correspond to an IP payload. Therefore, the network transmitter 164 is configured to packetize the compressed data frames FRM as payload data for transmission over the network STL 108. As an example, each of the packets can correspond to a respective compressed data frame FRM. Thus, the network transmitter 164 can transmit the data stream DS including the compressed data frames FRM over the network STL 108, such as an IP network.

In the example of FIG. 4, the timestamps TS that are bound to the respective compressed data frames FRM, demonstrated as bound timestamps TS_B, are provided from the digital logic component 154 to the network transmitter 164, such that the network transmitter 164 can insert the bound timestamps TS_B into a header of the respective packets. The bound timestamp TS_B further can include binding data, such as data link, that specifies the data block (e.g., a compressed or uncompressed frame) to which it has been associated. Thus, the bound timestamp TS_B can remain bound to the respective data block PCM_B and data frame FRM through the processing via the data encoder 162 to be inserted into the respective header of the data block PCM_B and corresponding data frame FRM. As an example, the network transmitter 164 can populate an RTP timestamp field with the bound timestamp TS_B associated with the respective compressed data frame FRM. For example, the bound timestamp TS_B (e.g., having 32 bits) can fit into the RTP timestamp field (e.g., also a 32-bit word).

It is to be understood that the data generator 150 is not intended to be limited to the example of FIG. 4. In other examples, the data encoder 162 can be omitted to provide the data blocks as linear or uncompressed data. Thus, the data stream can be provided directly to the network transmitter 164 for transmission of packetized data blocks, having the timestamp field being provided the bound timestamp TS_B, through the network. Thus, the data generator 150 can be configured in a variety of ways.

Figure 5:
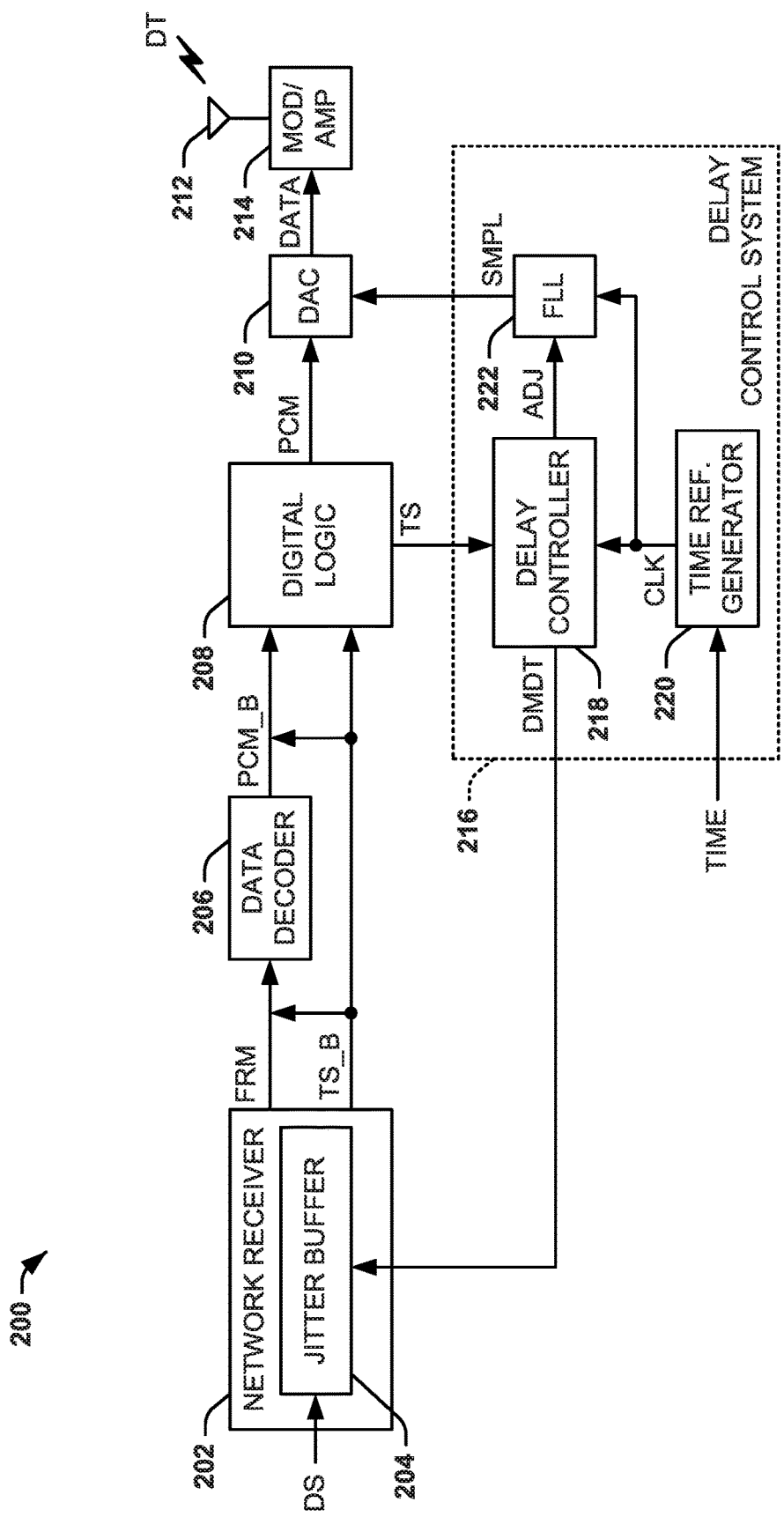
FIG. 5 illustrates an example of a transmitter that can be implemented in the transmitter system of FIG. 3.

FIG. 5 illustrates an example of a transmitter 200. As an example, the transmitter 200 can correspond to the transmitter 16 in the example of FIG. 3, and transmitter 256 in a simulcast system (e.g., FIG. 6), there can be any number of two or more such transmitters. Thus, the transmitter 200 can be configured to receive a signal carrying the time-stamped data packets from an upstream system data generator (e.g., the data generator 50) via a network STL (e.g., the network STL 108) and can measure a delay and control a time of wireless transmission of the data blocks. Thus, reference can be made to the example of FIG. 3 in the following description of the example of FIG. 5 for additional context.

The transmitter 200 includes a network receiver 202 that receives an input data stream DS (e.g., from the data generator 102 via the network STL 108). As an example, the network receiver 202 can be configured as an RTP receiver. In the example of FIG. 5, the network receiver 202 includes a jitter buffer 204 that is configured to queue the data packets that are received in the data stream DS. The jitter buffer 204 can provide a controllable delay of the release of the data packets (e.g., frames) from the jitter buffer 204 based on a measured delay of such packets determined from timestamps bound to each such packet. The data packets of the data stream DS are provided from the jitter buffer 204 as data frames FRM to a data decoder 206 that is configured to convert the data frames FRM back to the respective data blocks PCM_B. Data blocks can be in other forms depending on the type of media and modulation format.

As a further example, the network receiver 202 can read the timestamp that is bound to the payload corresponding to a respective compressed data frame FRM from each of the data packets in the data stream DS. For example, the network receiver 152 can read the timestamp that is bound to the RTP payload (e.g., the respective compressed audio frame FRM) from an RTP timestamp field in the header of the RTP packet. For example, the network receiver 202 can read the bound timestamp TS_B from the packet header upon release and de-packetization of the corresponding packet from the jitter buffer 204. Additionally, in response to the data decoder 206 decoding the compressed data frames FRM to provide the respective data blocks PCM_B, an associated processor (not shown) can maintain binding of the timestamps TS_B from the compressed data frames FRM to the decoded data blocks PCM_B, in a process similar to the reverse of that disclosed in the example of FIG. 4. Therefore, the bound timestamp TS_B can remain bound to the respective data frame FRM and data block PCM_B through the processing via the data decoder 206. In other examples, such as for uncompressed data transmission, the data decoder 206 function may be bypassed, in which case data blocks PCM_B are provided directly from the jitter buffer 204.

The timestamps TS_B that are read from the data packets by the network receiver 202 are provided to digital logic 208. The digital logic 208 can store the timestamps TS_B and maintain the binding of the timestamps TS_B with the respective compressed data frames FRM, and thus the respective data blocks PCM_B. The data blocks PCM_B are likewise provided from the data decoder 206 to the digital logic 208. The digital logic 208 can serialize the data blocks PCM_B to provide a serial digital data stream PCM corresponding to the data blocks PCM_B. The digital data stream PCM is provided to a digital-to-analog converter (DAC) 210 that is configured to convert the serial data stream PCM corresponding to the data blocks PCM into an analog signal, demonstrated as DATA. The analog signal DATA is modulated and amplified onto a RF carrier signal by a modulator/amplifier system 214. The wireless signal DT is transmitted via antenna 212.

Figure 6:
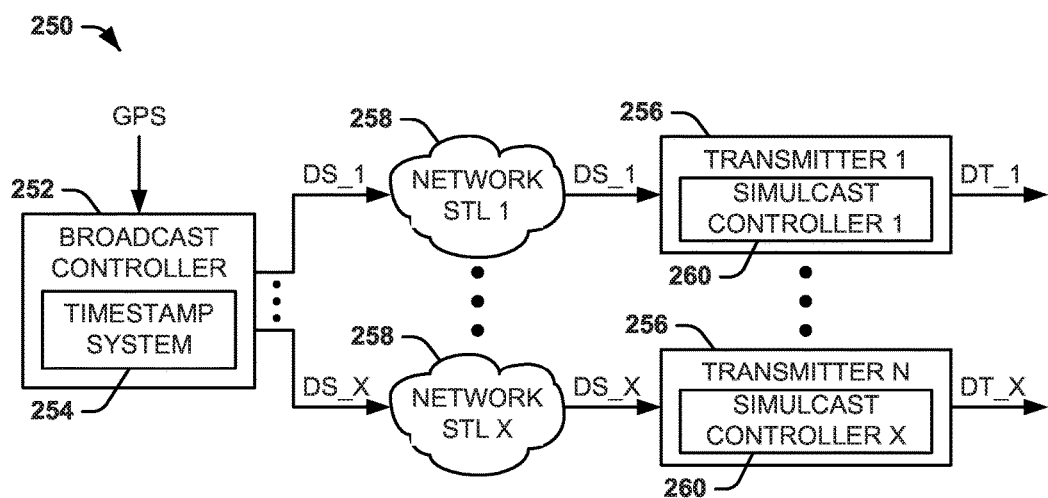
FIG. 6 illustrates an example of a simulcast transmission system.

As an example, the wireless signal DT can be transmitted as a broadcast media signal from the antenna 212 over a coverage area, such as in a simulcast transmission system (see, e.g., FIG. 6). While the example of FIG. 5 demonstrates the use of the DAC 210 to provide the analog DATA signal, which can be audio or video data, it is to be understood that the DATA signal could instead be implemented as a digital signal, such that the DAC 210 is obviated from the transmitter 200. Assuming the DATA includes audio media, for example, AES3 provides an industry standard protocol for local (e.g., studio environment) serial digital audio transport, and thus would not require the DAC 210. Instead the conversion process from PCM to DATA would be replaced by an AES3 transmitter. It is to be understood that the approach disclosed herein is applicable to various industry standards, which may vary depending on the type of media and geographical region where transmitter is located, for exchanging digital information.

Additionally, the digital logic component 208 can provide the extended timestamp TS associated with each of the respective data blocks PCM_B to a delay control system 216. The delay control system 216 includes a delay controller 218, a time reference generator 220, and a frequency-locked loop (FLL) 222. The time reference generator (e.g., corresponding to timestamp generator 52 of FIG. 2) 220 generates one or more real-time clock (CLK) signals based on a received time signal (e.g., a GPS signal from a satellite). Similar to as described previously, the real-time clock signal CLK can include multiple clock signals having separate frequencies. For example, the time reference generator 220 can provide one clock signal having a frequency of 1 Hz, such as corresponding to the UTC second, and another clock signal having a frequency of 10 MHz. The extracted timestamps TS are provided to the delay controller 218 of delay control system 216.

The delay controller 218 is configured to measure the delay of transmission of the serial data stream, such as the amount of delay from processing at the ADC 152 to the PCM serial data stream at the DAC 210 based on the real-time clock signal CLK. Therefore, based on the measured delay, the delay controller 218 can control the time of the of the respective data block being provided to the DAC 210, such as based on manipulating the jitter buffer 204. That is, the delay controller 112 can adjust a sampling frequency of the DAC 210 that converts the data blocks to analog for wireless transmission of the transmitted wireless signal DT based on a comparison of the extended timestamp TS and the real time clock signal CLK. As another example, the delay controller 112 can add or remove data to or from the jitter buffer between consecutive data packets based on the comparison. Thus, the time of transmission of the transmitted wireless signal DT can be controlled to time the transmission of the transmitted wireless signal DT in a flexible manner.

In the example of FIG. 5, ADJ is provided to the FLL 222. The FLL 222 is configured to provide a sampling signal SMPL to the DAC 210 that defines a sampling frequency of the DAC 210 in converting the serial samples of the data blocks to the DATA signal for wireless transmission via the antenna 212. Thus, the ADJ signal can be provided as an adjustment signal to change the frequency of the sampling SMPL signal, and thus the sampling rate of the DAC 210. Because the ADJ signal is generated by the delay controller 218 based on the comparison, and thus based on the time of transmission of the PCM serial data stream at the ADC 152 to the PCM serial data stream at the DAC 210 relative to a preprogrammed delay time, the signal ADJ can adjust the sampling rate to control the delay of the wireless transmission of the data blocks from the transmitter 200 in a hitless manner (e.g., no loss of data continuity). As an example, the FLL has a frequency reference provided by the real-time clock signal CLK (e.g., a GPS based signal). Therefore, under static conditions, where the amount of data stored in jitter buffer is constant, the frequency of the sampling signal SMPL provided to the DAC 210 is the same as the frequency of the sampling signal provided to the ADC 152 (FIG. 4).

As another example, delay controller 218 may provide another signal (DMDT) to the jitter buffer 204 and can correspond to dummy data packets. As an example, the dummy data packets in the DMDT signal can be inserted between consecutive data packets in the jitter buffer 204. Therefore, the amount of dummy data packets in the DMDT signal that are inserted between the consecutive data packets can add to the delay of the data blocks that are eventually processed from the jitter buffer 204. As another example, the DMDT signal can be configured to remove (e.g., drop) data packets. As a result, the amount of data contained in the jitter buffer 204 can be reduced and the delay of the data blocks can be decreased.

FIG. 6 illustrates an example of a simulcast transmission system 250. The simulcast transmission system 250 can be implemented in a variety of communications applications. As one example, the system 250 can provide for transmission of media (e.g., audio, video, audio and video, data) that is broadcast from a plurality of geographically distributed transmitters 256. As another example, the system 250 can provide for the transmission of different versions of the same media from one or more transmitters 256 that may be geographically co-located or geographically distributed.

The simulcast transmission system 250 includes a broadcast controller 252 that is configured to generate a data stream that includes data blocks, such as PCM samples of raw media data. As an example, the media data blocks can include audio data, video data or a combination of audio and video data. In the example of FIG. 6, the broadcast controller 252 includes a timestamp system 254. The timestamp system 254 generates an extended timestamp, such as by combining separate timestamps that are synchronized but separately generated to provide time references in different time ranges based on multiple time base signals. For instance, the timestamp system is configured according to the examples disclosed herein of FIGS. 1, 2 and 7. The timestamp is associated with each of the data blocks based on one or more time base, demonstrated in the example of FIG. 6 as a GPS signal. The timestamps can each correspond to a time of creation of the respective data blocks (e.g., corresponding to a first bit of a first sample of each of the data blocks). As an example, each of the timestamps can be bound to a respective data blocks during processing and conversion of the data blocks, such as to encode the data blocks into compressed data frames and into respective data packets for transmission from the broadcast controller 252.

The timestamp associated with each data block can be inserted into each respective packet of the data stream (e.g., in a header), and the data stream of packets is transmitted to a plurality X of transmitters 256 via a respective plurality N of network STLs 258 as signals DS_1 through DS_X, where X is a positive integer greater than one. As an example, the network STLs 258 can be IP network connections, such that the data stream of packets DS_1 through DS_X corresponds to an IP multicast of the data stream DS. Therefore, the network STLs 258 can each introduce a delay that is dynamic and which can change over time due to route changes, changes in router characteristics, and/or changes in link characteristics with respect to each other. The transmitters 256 are each configured to receive the data stream DS and to transmit the data stream as respective transmitted signals DT_1 through DT_N, such as wirelessly via antennas.

As an example, each of the transmitters 256 can include a jitter buffer (e.g., the jitter buffer 154) that is configured to queue the data packets corresponding to the data blocks for transmission from the respective transmitter 256. For example, the transmitters 256 can each be configured to broadcast the respective transmitted signals DT_1 through DT_N over separate coverage areas that can include separate but overlapping geographic regions with respect to each other. In other examples, the transmitters 256 can broadcast different versions of the same transmitted signals DT_1 through DT_N over the same coverage area. As an example, the timestamps generated as disclosed herein, thus can be used to synchronize the transmission of the transmitted signals DT_1 through DT_N with respect to each other.

As a further example, the transmitters 256 are each configured to extract the timestamp from each of the data packets in the respective data streams DS_1 through DS_N (e.g., from a header). In the example of FIG. 6, the each of the transmitters 256 includes a simulcast controller 260 that can extract the timestamp from each of the data blocks in the data stream DS to measure a delay time associated with the transmission of the respective data blocks through the network STL 258, such as disclosed herein (see, e.g., FIG. 5). In the example of FIG. 6, the simulcast controller 260 also receives the GPS signal, such that the simulcast controller 260 can subtract a time associated with the timestamp from a real-time reference (e.g., via a real-time clock) that is based on the signal GPS to determine the measure of delay time. Thus, the delay of each of the data blocks through the respective network STLs 258 can be measured individually based on the extracted timestamp of each of the data blocks of the data streams DS_1 through DS_N.

Additionally, the simulcast controller 260 can be further configured to control a transmission time associated with the transmitted signals DT_1 through DT_N based on the delay time of the data blocks. As an example, the simulcast controller 260 in each of the transmitters 256 can be configured to compare a measured delay time with a preprogrammed delay time, and can be configured to control the queuing of the data blocks in the jitter buffer based on the comparison of the measured delay time with the preprogrammed delay time. The extended timestamp TS, which is generated by the timestamp system 254, enables the delay time to be measured over an extended time interval.

Figure 7:
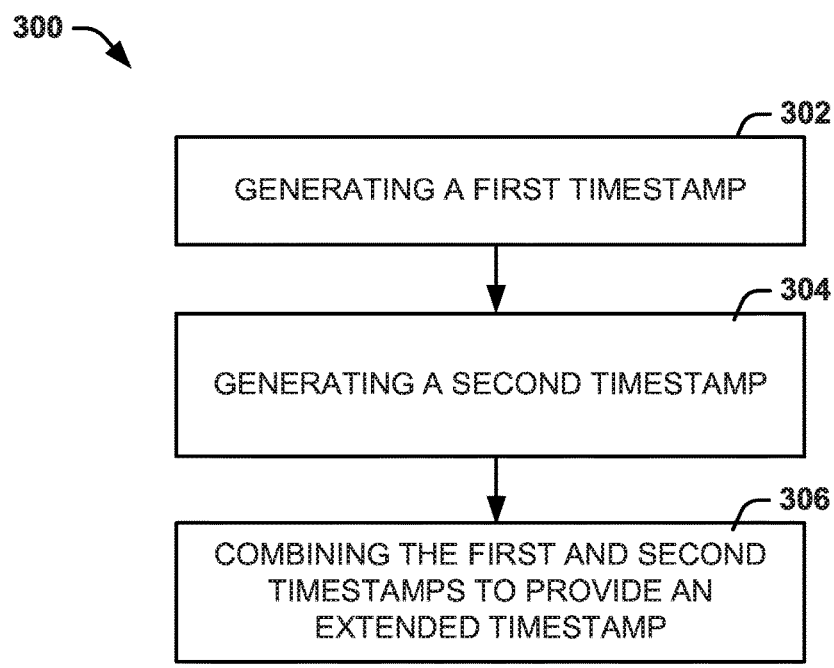
FIG. 7 is a flow diagram illustrating an example method for generating an extended timestamp.

In view of the foregoing structural and functional features described above, a method in accordance with various aspects of the present invention will be better appreciated with reference to FIG. 7. While, for purposes of simplicity of explanation, the method of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. The method can be implemented, for example, by one or more processors executing instructions, by hardware (e.g., a field programmable gate array) or a combination of hardware and software. Moreover, not all illustrated features may be required to implement a method in accordance with an aspect of the present invention.

FIG. 7 illustrates a method 300 for generating an extended timestamp. At 302, the method includes generating (e.g., by timestamp generator 12, 52) a first timestamp in response to at least one clock signal. The first timestamp may be referenced to a global time base and have a resolution that resides within a first range of values corresponding to a first time range.

As an example, the first timestamp may be generated at a frequency according to one or more clock signals. For example, the method may include generating (e.g., by GPS receiver 60) first and second clock signals in response to a receiving a GPS signal. As a further example, the method may include generating a periodic pulse signal in response to the detecting the first clock signal. The periodic pulse signal being provided to reset the first timestamp to a starting value and to increment the second timestamp, such that the first timestamp and the second timestamp being incremented in synchronization.

At 304, the method includes generating a second timestamp. For example, the second timestamp may be generated (e.g., by timestamp generator 20, 54) in response to the at least one clock signal. The second timestamp may be derived from a second time base and have a resolution that resides within a second range of values and corresponding to a second time range that is complementary to and greater than the first time range. The second time base may be referenced to the same time standard as the GPS signal that provides a time base used for generating the first timestamp.

As an example, generating the second timestamp at 304 may include comparing (e.g., by comparator 84) the second timestamp with a time value corresponding to an absolute time reference corresponding to the second time base. The method may also include setting (e.g., by load control 86) a value of the second timestamp to the absolute time reference in response to detecting (e.g., by range detector 88) a difference between the second timestamp and the absolute time reference and based on the first timestamp.

At 306, the method 300 includes combining (e.g., by combiner 28, 56) the first and second timestamps to provide an extended timestamp representing a time value within a range of continuous time values.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system for generating extended time reference for simulcast transmission, the system comprising:
    first timestamp generator circuitry to provide a first timestamp in response to at least one input clock signal, the first timestamp being derived based on a global time base and having a resolution that resides within a first range of values corresponding to a first time range;
    second timestamp generator circuitry to provide a second timestamp in response to the at least one input clock signal, the second timestamp being derived based on a second time base and having a resolution that resides within a second range of values complementary to the first timestamp and corresponding to a second time range that is greater than the first time range, the second time base providing an absolute time reference; the second timestamp generator circuitry further comprising time manager circuitry to set the second timestamp generator circuitry to a time value corresponding to the absolute time reference and based on the first timestamp,
    wherein the time manager comprises instructions stored in non-transitory machine readable media that are executable by a processor, the time manager instructions comprising:
        comparator instructions programmed to compare the second timestamp with a time value corresponding to the absolute time reference; and
        load control instructions programmed to load the time value corresponding to the absolute time reference into the second timestamp generator circuitry in response to the comparator detecting a difference between the second timestamp and the time value corresponding to the absolute time reference; and
        combiner circuitry to combine the first and second timestamps to provide a reference timestamp having a value over an extended range of continuous time values.

2. The system of claim 1, further comprising a time base interface to receive a time base signal, the time base interface providing the absolute time reference based on the time base signal.

3. The system of claim 2, wherein the time base interface comprises a client to receive the time base signal from a server according to a networking protocol.

4. The system of claim 2, wherein the time base interface receives the time base signal in a National Marine Electronics Association (NMEA) data format.

5. The system of claim 1, wherein the at least one input clock signal comprises at least one clock signal derived from the global time base.

6. The system of claim 5, further comprising a GPS receiver to receive a global positioning system (GPS) signal corresponding to the global time base.

7. The system of claim 1, further comprising:
    an input to receive an input media stream;

a buffer logic to buffer the input media stream in memory and to provide an output media stream of data blocks that each includes the reference timestamp;
a transmitter to transmit the timestamped output media stream via a network.

8. The system of claim 1, further comprising a transmitter that includes:
a receiver to receive an input media stream via a network and to derive the reference timestamp for each packet of the received media stream and to provide a stream of data blocks; and
delay controller circuitry configured to measure a delay associated with each packet of the input media stream based on the reference timestamp that has been derived for each packet relative to the global time base and to control converting the input media stream to a corresponding output stream for transmission based on the measured delay.

9. The system of claim 1, further comprising a plurality of simulcast transmitters that receive an input stream of data blocks and determine a delay associated with each input stream of media based on the reference timestamp that is bound to each of the data blocks, each transmitter controlling transmission time for each of the data blocks based on the determined delay.

10. The system of claim 1, wherein the time manager instructions further comprise range detector instructions to monitor the first timestamp, the range detector instructions programmed to trigger the load control instructions to set the second timestamp generator circuitry in response to detecting the first timestamp at an predetermined intermediate value within its range of values.

11. A system for generating extended time reference for simulcast comprising:
first timestamp generator circuitry to provide a first timestamp in response to at least one input clock signal, the first timestamp being derived based on a global time base and having a resolution that resides within a first range of values corresponding to a first time range, wherein the at least one input clock signal comprises at least one dock signal derived from the global time base;
second timestamp generator circuitry to provide a second timestamp in response to the at least one input clock signal, the second timestamp being derived based on a second time base and having a resolution that resides within a second range of values complementary to the first timestamp and corresponding to a second time range that is greater than the first time range;
combiner circuitry to combine the first and second timestamps to provide a reference timestamp having a value over an extended range of continuous time values; and
a OPS receiver to receive a global positioning system (GFS) signal corresponding to the global time base, wherein the GPS receiver provides first and second clock signals;
detector circuitry to detect the second clock signal; and
pulse generator circuitry to generate a periodic pulse signal based on the detector circuitry detecting the second clock signal and in response to the first clock signal, the periodic pulse signal being provided to reset the first timestamp generator circuitry and to increment the second timestamp generator circuitry.

12. The system of claim 11, wherein the second time base provides an absolute time reference, the second timestamp generator circuitry further comprising time manager instructions stored in non-transitory machine readable media that are executable by a processor, the time manager instructions programmed to set the second timestamp generator circuitry to a time value corresponding to the absolute time reference and based on the first timestamp.

13. The system of claim 12, wherein the time manager instructions further comprise:
comparator instructions programmed to compare the second timestamp with a time value corresponding to the absolute time reference; and
load control instructions programmed to load the time value corresponding to the absolute time reference into the second timestamp generator circuitry in response to the comparator instructions detecting a difference between the second timestamp and the time value corresponding to the absolute time reference.

14. The system of claim 13, wherein the time manager instructions further comprises range detector instructions programmed to monitor the first timestamp, the range detector instructions triggering the load control instructions to set the second timestamp generator circuitry in response to detecting the first timestamp at an predetermined intermediate value within its range of values.

15. The system of claim 11, wherein the first timestamp generator circuitry comprises a first counter to increment the first timestamp in response to the first clock signal;
wherein the second timestamp generator circuitry comprises a second counter to increment the second timestamp in response to the first clock signal and the second clock signal.

16. The system of claim 11, wherein the second timestamp generator circuitry further comprising time manager instructions programmed to set the second timestamp generator circuitry to a time value corresponding to the second time base and based on the first timestamp, each of the first time base and the second time base being referenced to a common time standard.

17. A simulcast transmission system comprising:
broadcast controller circuitry configured to generate a data stream of data blocks and to packetize each data block of the data stream for transmission via a network, the broadcast controller circuitry comprising:
timestamp generator circuitry to generate an extended timestamp associated with generation of each respective data block of the data stream in a global time base, the extended timestamp being a combination of first and second timestamps, each of the first and second timestamps being generated with reference to a respective time base and in synchronization with respect to each other over a corresponding range of values in different and complementary time ranges, the timestamp generator circuitry comprising:
a GPS receiver to receive a global positioning system (GPS) signal corresponding to the global time base and to generate first and second clock signals; and
pulse generator circuitry to generate a periodic pulse signal in response to the detecting the first clock signal, the periodic pulse signal being provided to reset the first timestamp to a starting value and to increment the second timestamp,
the broadcast controller circuitry further configured to bind the extended timestamp associated with a given one of the data blocks into a header of a respective one of the data blocks of the data stream being transmitted; and
a plurality of transmitters that each receives a respective a data stream of data packets from the network, each of the plurality of transmitters being configured to extract the extended timestamp from the header of each of the data packets in the data stream and to process and convert the data stream into an analog output signal for simulcast transmission, each of the plurality of transmitters comprising a simulcast controller configured to measure a delay associated with each of the data blocks based on the respective extended timestamp relative to the global time base and to control at least a portion of the processing and conversion of the data stream into the analog output signal based on the measured delay to synchronize transmission of the analog output signal from each the plurality of transmitters.

18. The system of claim 17, wherein the timestamp generator circuitry comprises comparator circuitry to compare the second timestamp with a time value corresponding to an absolute time reference corresponding to a time base for the second timestamp; and load control circuitry to set a value for the second timestamp to the absolute time reference in response to the comparator circuitry detecting a difference between the second timestamp and the absolute time reference and based on the first timestamp.

19. A method for generating extended time reference for simulcast transmission, the method comprising:

generating a first timestamp in response to at least one clock signal, the first timestamp being derived based on a global time base and having a resolution that resides within a first range of values corresponding to a first time range;

generating a second timestamp in response to the at least one clock signal, the second timestamp being derived based on a second time base and having a resolution that resides within a second range of values and corresponding to a second time range that is complementary to and greater than the first time range;

combining the first and second timestamps to provide an extended timestamp representing a time value within a range of continuous time values;

comparing the second timestamp with a time value corresponding to an absolute time reference corresponding to the second time base; and setting a value of the second timestamp to the absolute time reference in response to the detecting a difference between the second timestamp and the absolute time reference and based on the first timestamp.

20. A method for generating extended time reference for simulcast transmission, the method comprising:

generating a first timestamp in response to at least one clock signal, the first timestamp being derived based on a global time base and having a resolution that resides within a first range of values corresponding to a first time range;

generating a second timestamp in response to the at least one clock signal, the second timestamp being derived based on a second time base and having a resolution that resides within a second range of values and corresponding to a second time range that is complementary to and greater than the first time range;

combining the first and second timestamps to provide an extended timestamp representing a time value within a range of continuous time values;

receiving a global positioning system (GPS) signal corresponding to the global time base;

generating first and second clock signals in response to the GPS signal; and generating a periodic pulse signal in response to the detecting the first clock signal, the periodic pulse signal being provided to reset the first timestamp to a starting value and to increment the second timestamp, the first timestamp and the second timestamp being incremented in synchronization.

21. The method of claim 20, further comprising:

comparing the second timestamp with a time value corresponding to an absolute time reference corresponding to the second time base; and setting a value of the second timestamp to the absolute time reference in response to the detecting a difference between the second timestamp and the absolute time reference and based on the first timestamp.

* * * * *